ANALOG CENTESIMAL RECORDER HAVING REDUNDANT DIGIT

ANALOG CENTESIMAL RECORDER HAVING REDUNDANT DIGIT

1

3,389,397

ANALOG CENTESIMAL RECORDER HAVING REDUNDANT DIGIT

Rowland G. Lex, Jr., Ambler, George C. Mergner, Glenside, Norman E. Polster, Southampton, and Albert J. Williams, Jr., Philadelphia, Pa., assignors to Leeds & Northrup Company, Philadelphia, Pa., a corporation of Pennsylvania Filed Mar. 3, 1967, Ser. No. 620,424
15 Claims. (Cl. 346—35)

ABSTRACT OF THE DISCLOSURE

An apparatus for recording a variable which may fluctuate over a wide range to produce a strip chart having two analog type records with a 100:1 relationship between the significance of the records.

The variable to be recorded is represented by a plurality of digital signals, each of different significance one with respect to another. A first group of these digital signals is converted to an analog signal which drives the coarse recorder pen, and another group of digital signals is converted to an analog signal which drives the fine recorder pen. A digital signal of intermediate significance is used in deriving both the analog signal for the coarse recorder pen and the analog signal for the fine recorder pen. In one embodiment, the zero reference mark for the fine recording pen is not at the extreme end of the fine chart-marking path, and the fine recorder pen may be provided with an extended chart-marking path.

It is an important object of the present invention to incorporate many of the advantages of the prior art type recorders in a recorder which produces a record which gives a good analog display of the value and rate of change of value of the recorded variable and permits reading of this value and rate of change of this value over a wide range of value and rate of change of value with high resolution of both. This is accomplished by a recorder having a fine and a coarse recording pen, each movable through a chart-marking path transverse of the strip chart. The fine recording pen can move through its chart-marking path repeatedly and thereby makes multiple use of a portion of the chart width. A change in position of the coarse chart-marking means of one division is 100 times as significant as a change in position of the fine chart-marking means of one division, both of said changes in position being referred to the input signal. For this reason, the recording is referred to as analog centesimal recording and it provides a record having the desirable characteristics previously stated.

Further in accordance with this invention, the variable to be recorded is in digital form or may be converted into a plurality of digital signals, each of different significance, one with respect to the other. A first group of these digital signals, including, at least, the digital signal of most significance and the digital signal of intermediate significance, is converted to an analog signal which drives the coarse recorder pen. A second group of digital signals, including the aforementioned digital signal of intermediate signifiance and one or more digital signals of less significance, is converted to a second analog signal which drives the fine recorder pen.

By providing redundancy, that is, by applying the digital signal of intermediate significance to both recorder pens, the coarse recording pen as well as the fine recording pen will move whenever there is a change in the digital signal of intermediate significance. This redundancy provides a more informative and a more readable record of fluctuations in the variable. A recorder which has redundancy such as this produces a record which can be

2 contrasted with the record produced by a recorder which does not have redundancy. In such a recorder, the coarse pen is stationary as the fine pen sweeps through its chart-marking path and only takes a step between sweeps of the fine pen; whereas, in a recorder having redundancy, the coarse pen moves in a number of steps as the fine pen sweeps through its chart-marking path.

In a particular embodiment of applicants' invention, there is provided a frequency recorder particularly suitable for recording fluctuations in power line frequency.

It is a further object of the present invention to provide a frequency recorder which maintains a good display of the analog characteristics of the input signal when its instantaneous value is normally fluctuating with only small deviations above and below a desired value corresponding to a zero reference mark in a recording strip of less significance. This recorder includes means for inscribing the information mark representing the digital signal of less significance so that, for good analog display, the information mark can be positioned above the zero reference mark or as much as several divisions below the zero reference mark.

In one type of frequency recorder, the zero reference mark of the fine recording pen is at one extreme side of the recording strip. In such recorders, when the frequency goes from just above 60 c.p.s. to just below 60 c.p.s., the fine recording pen must travel completely across the recording strip. Since power line frequency fluctuates about 60 c.p.s. much of the time, the fine recording pen in such a recorder makes frequent traverses across the width of the recording strip, thus producing a record which is difficult to interpret. In accordance with one aspect of this invention, the foregoing is avoided.

In one embodiment of the preesnt invention, the zero reference mark of the fine recording pen is not at the extreme side of the recording strip but instead is so located that gradual frequency deviations from 60.000 c.p.s. upward to 60.059 and downward to 59.960 c.p.s. can be recorded smoothly by the fine pen without making a rapid traverse across the strip of the chart assigned to it. In such a recorder, the coarse pen will normally move only slightly around the 60.000 c.p.s. mark near the center of the recording strip assigned to it. Of course, under extreme conditions in which the frequency has abnormal excursions, the coarse recording pen will indicate the excursions and the fine pen can still be used to determine the magnitude of the fluctuations with high resolution. When the fine recording pen is so arranged to cover a chart-marking path from .060 c.p.s. through .000 c.p.s. up to .059 c.p.s. inclusive, the fine scale is considered to be folded around .060 c.p.s.

The foregoing and other objects, features and advantages of the invention will be better understood from the following more detailed description and appended claims, in conjunction with the drawings, in which:

Figure 1:
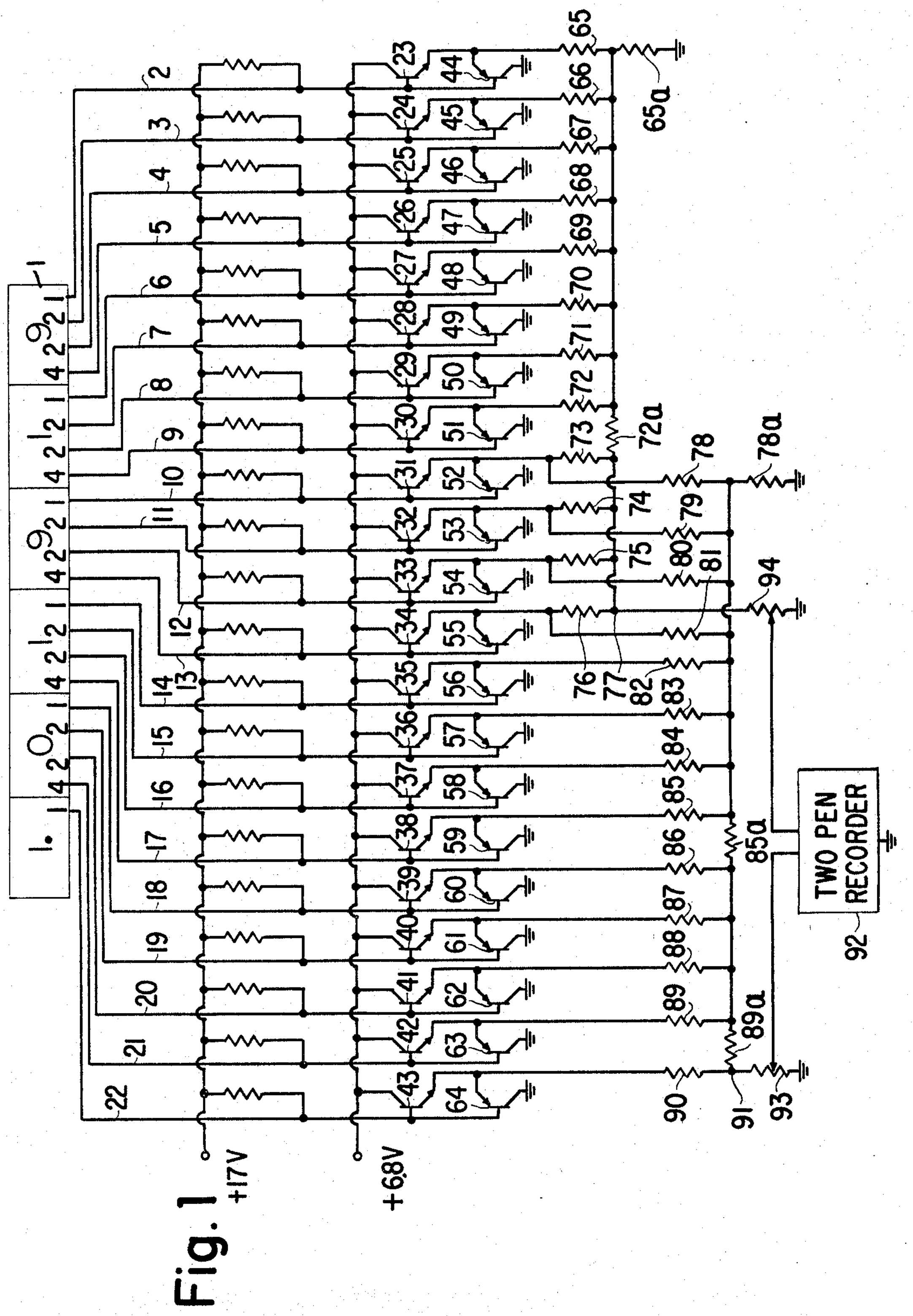
FIG. 1 shows the circuitry for deriving the recorder signals from a digital input representing voltage.
Figure 2:
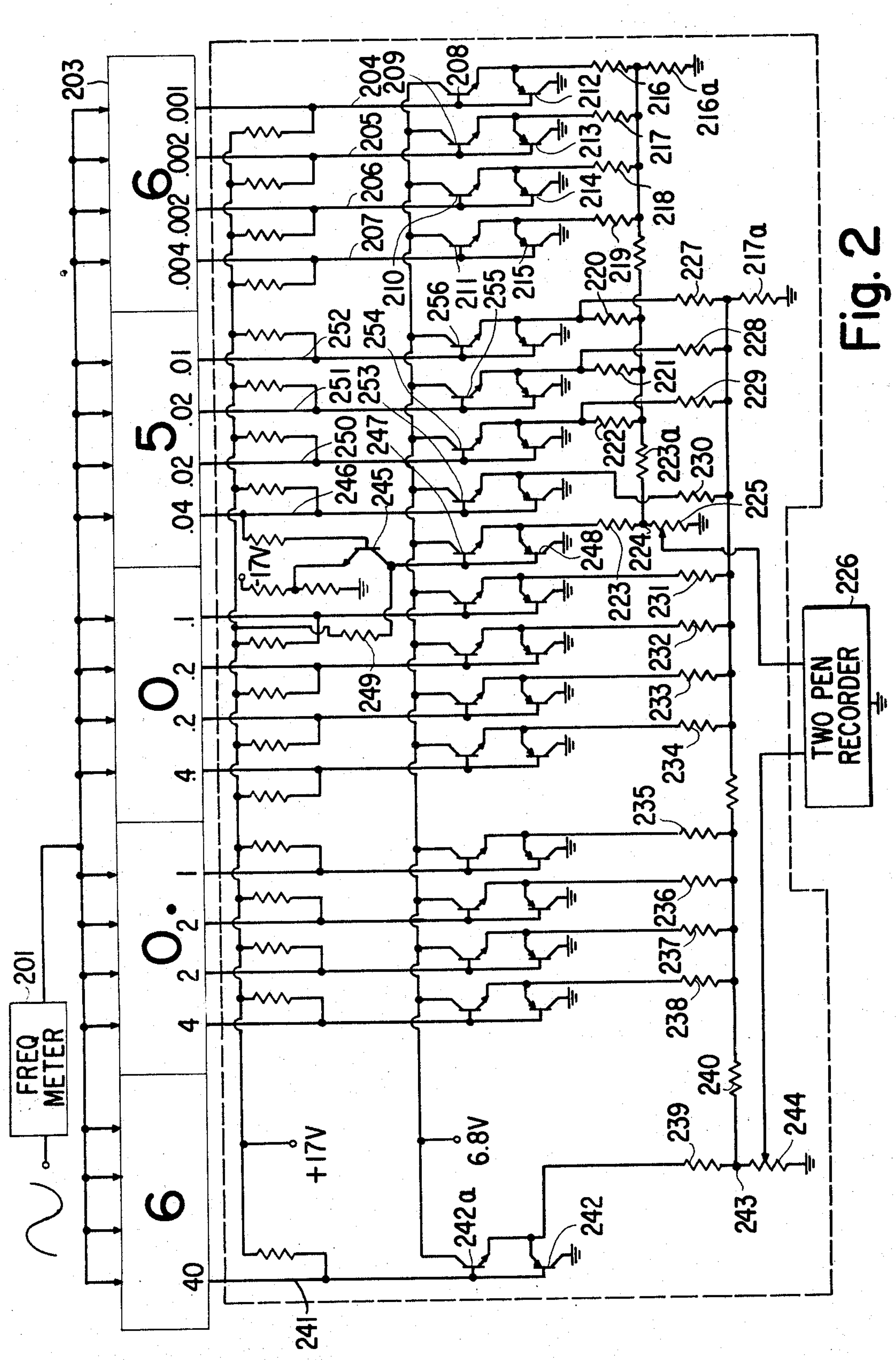
FIG. 2 shows the circuitry for deriving the recorder signals from a digital input representing power line frequency.
Figure 2E:
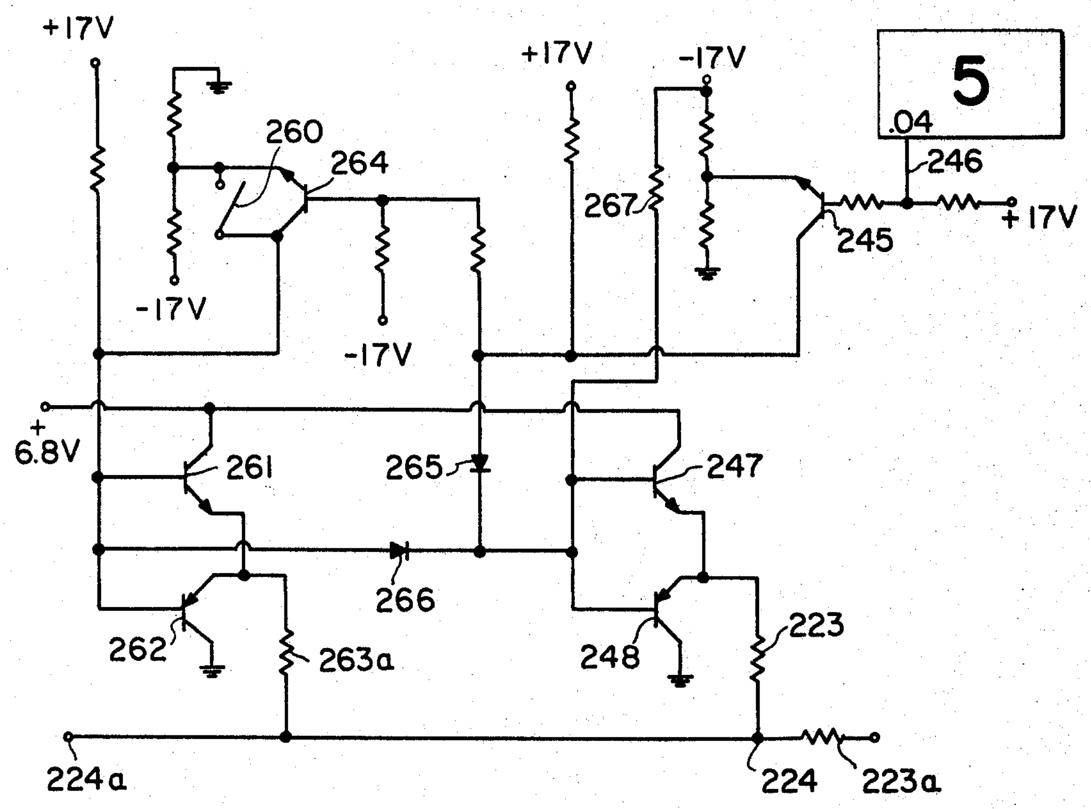
Figure 3:
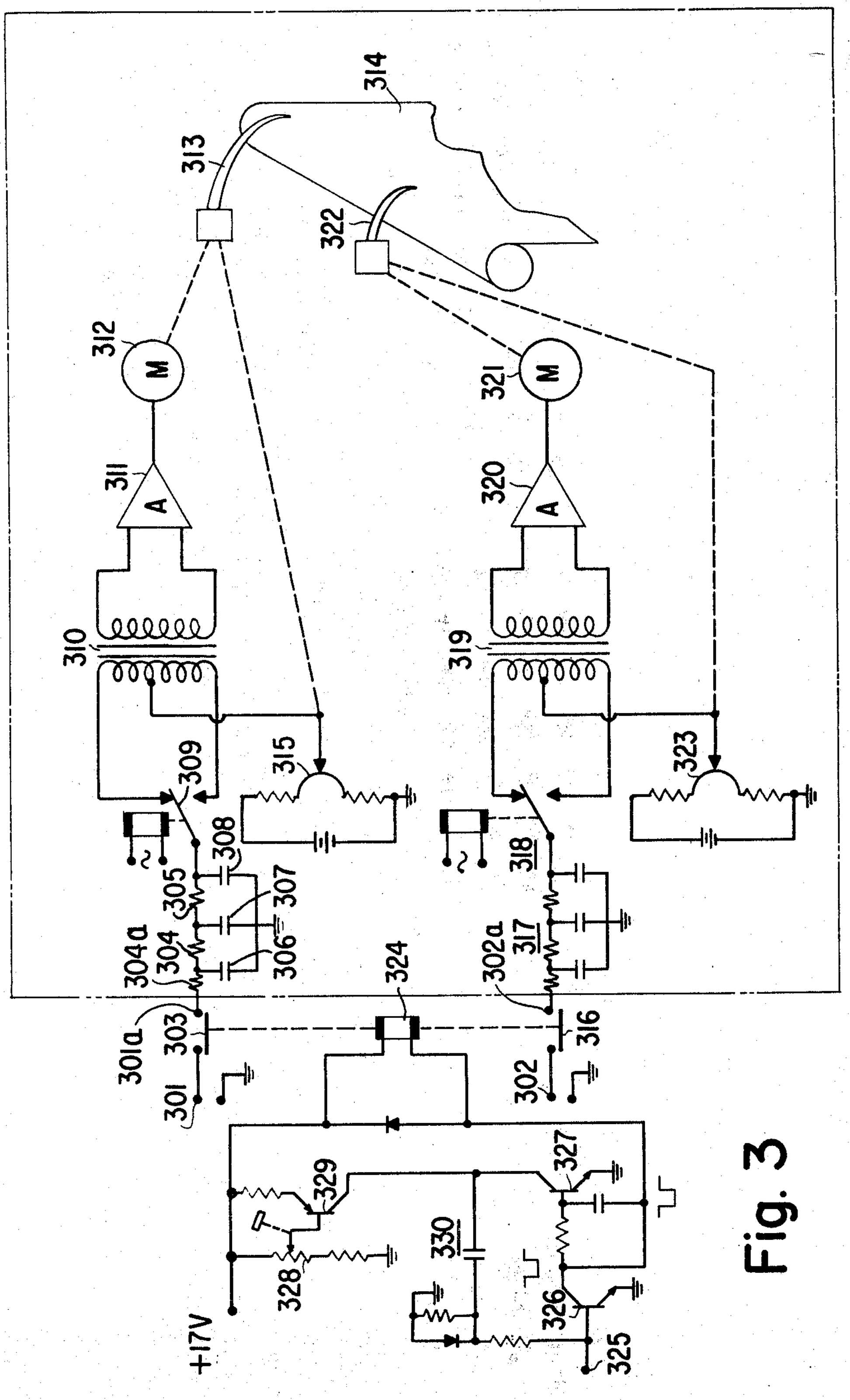
Figure 4:
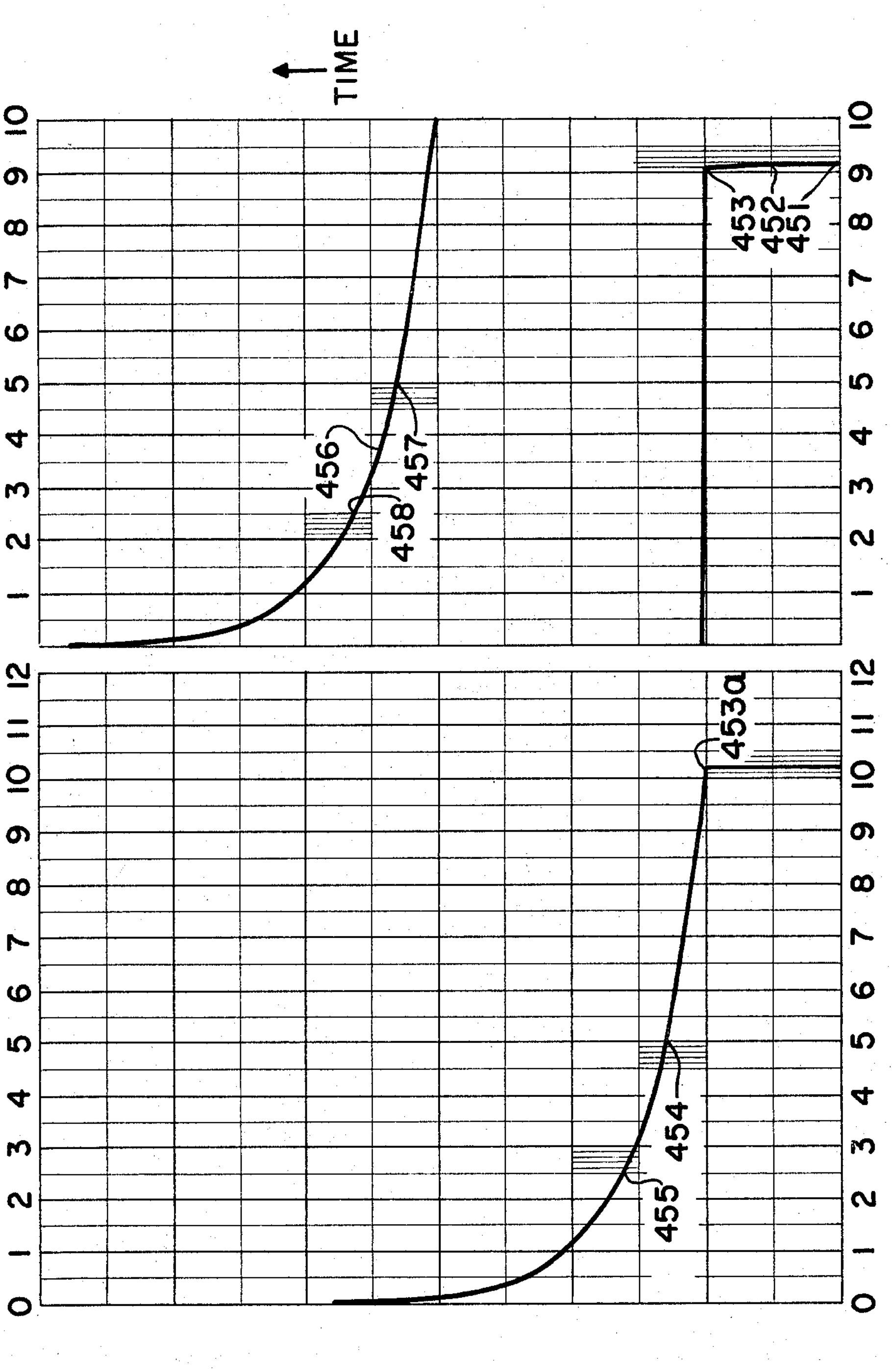
Figure 4A:
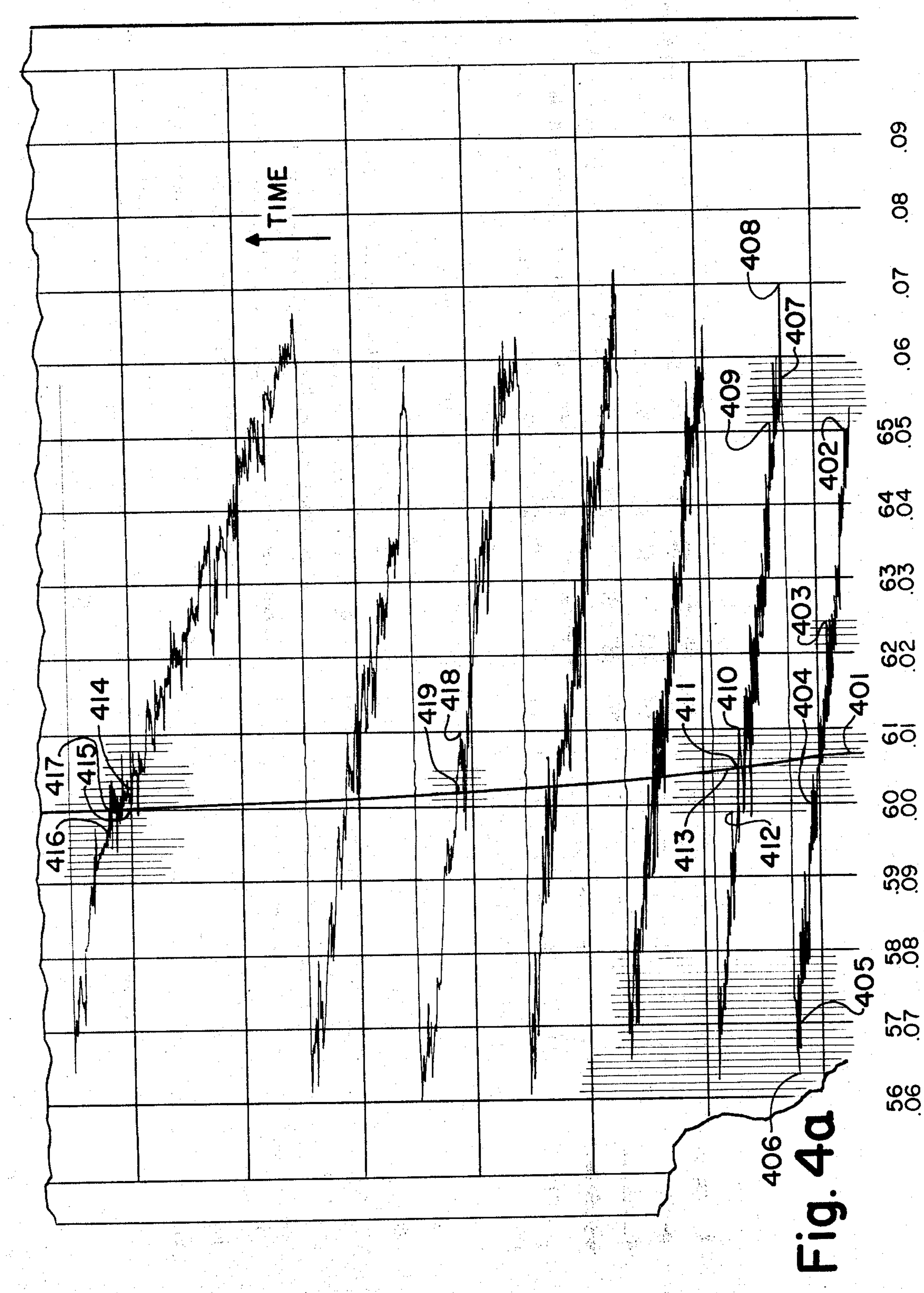
Figure 5:
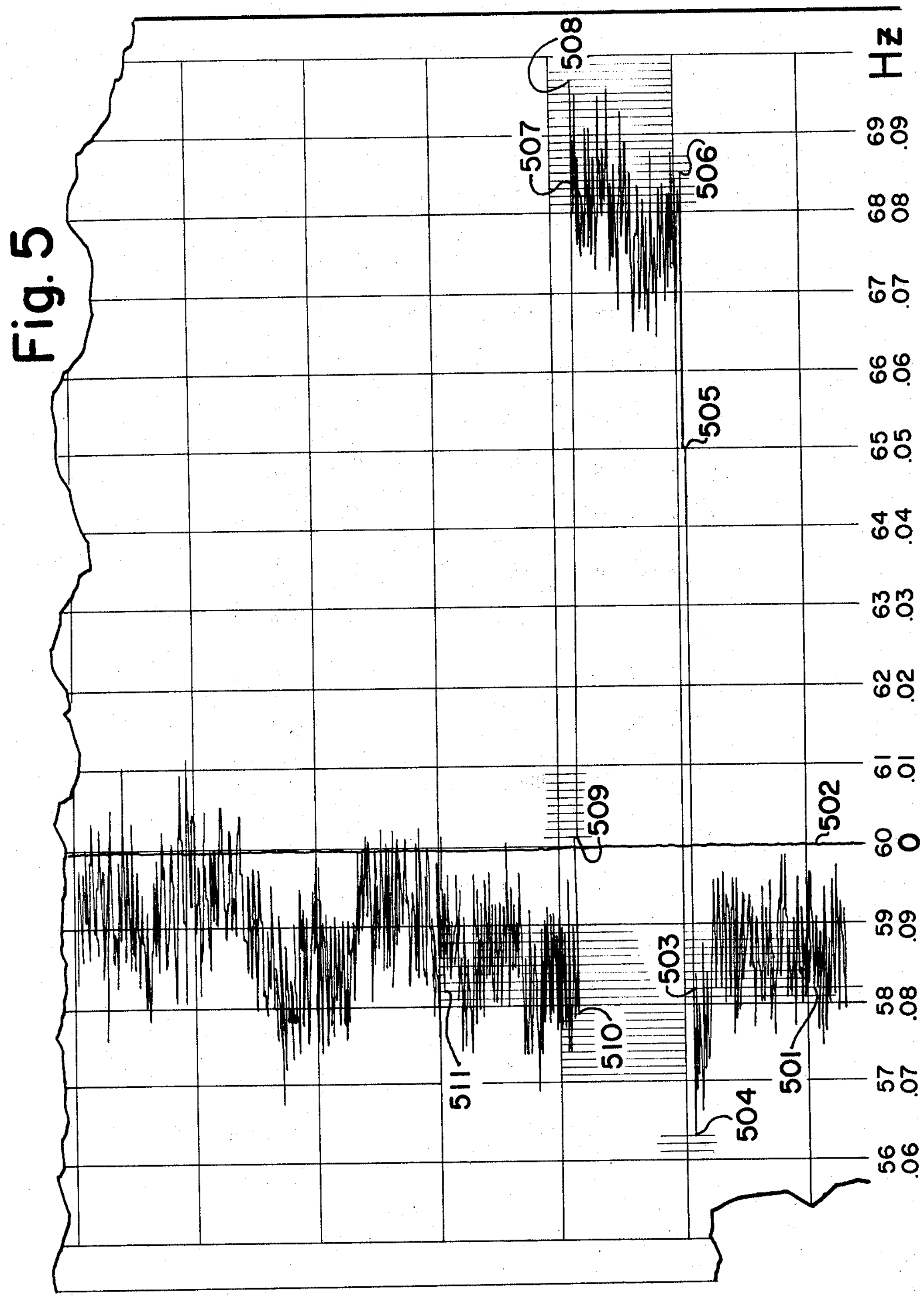
Figure 6:
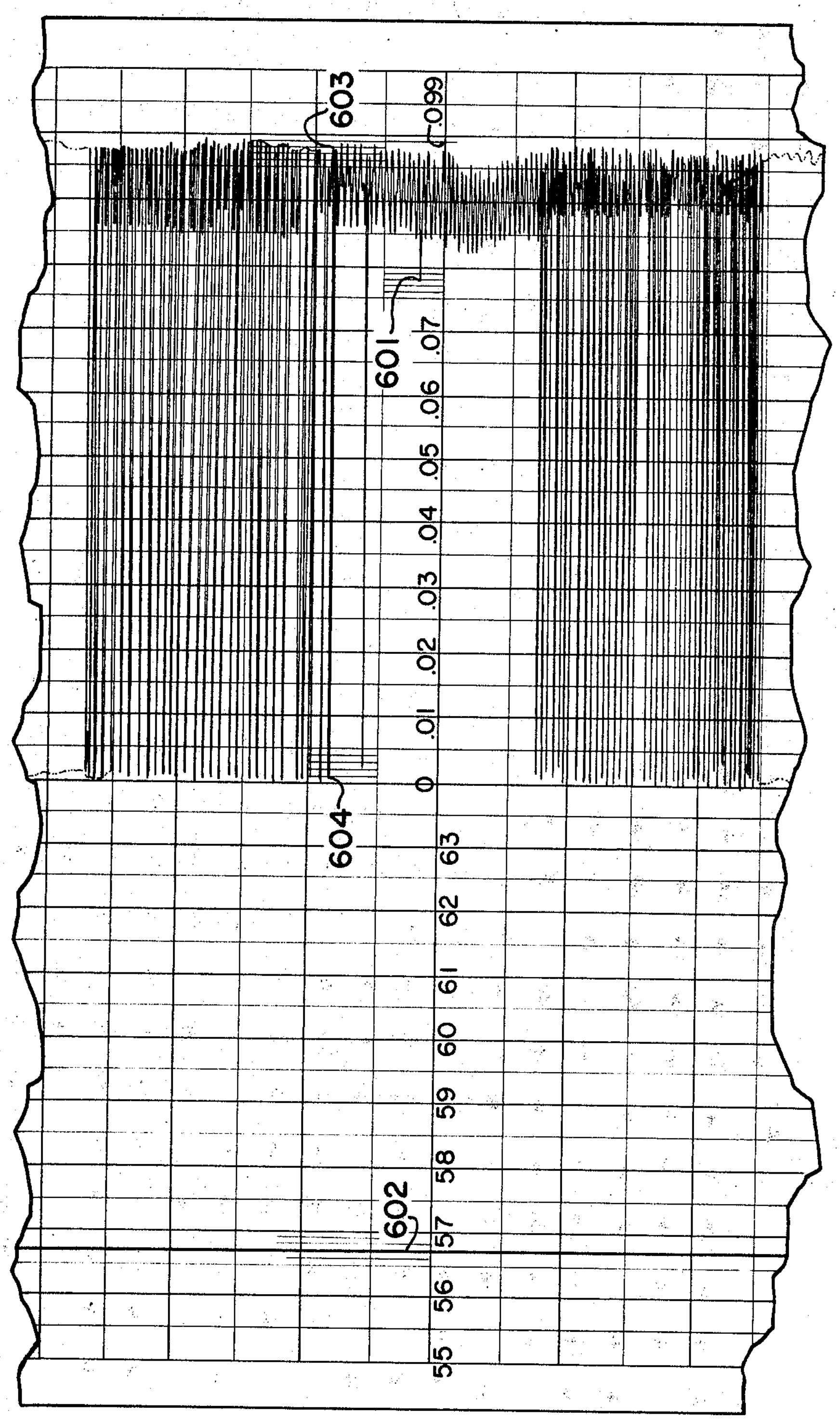

FIG. 2*a* shows a modification of FIG. 2;

FIG. 2*b* shows a scale for the modification in which the chart-marking path is extended;

FIG. 2*c* is a chart showing the OPEN and CLOSE positions of the switch in relation to the scale of FIG. 2*b*;

FIG. 2*d* shows a scale for a modification in which the chart-marking path is folded about a value other than zero;

FIG. 2*e* shows another modification of FIG. 2;

FIG. 3 shows the details of the two-pen recorder;

FIG. 4 shows a strip chart produced by the embodiment of FIG. 1;

FIG. 4*a* shows a strip chart record of frequency as provided by the recorder of FIG. 2 with modification of FIG. 2*a*;

FIG. 5 shows a strip chart recording power line frequency produced by a recorder having an extended chart-marking path; and FIG. 6 is another strip chart produced by a recorder which does not have an extended chart-marking path.

FIG. 1 shows the circuitry for producing the two recorder signals which may be applied to the recorder shown in FIG. 3. Referring now to FIG. 1, there is shown a digital register 1 containing a plurality of digital signals representing a continuously changing variable. The register 1, for example, may be the output register of a digital voltmeter. An example of a value of the variable, as represented by the digital signals, is shown on the register. In this case, the value 1.01919 has been shown.

In the FIG. 1 embodiment, each digital signal is in a 1–2–2*–4 code. For the convenience of the reader, the specific 1–2–2*–4 code used is reproduced below with the most significant digit at the left:

| | 4 | 2* | 2 | 1 |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 1 | 0 |
| 5 | 0 | 1 | 1 | 1 |
| 6 | 1 | 1 | 0 | 0 |
| 7 | 1 | 1 | 0 | 1 |
| 8 | 1 | 1 | 1 | 0 |
| 9 | 1 | 1 | 1 | 1 |

The digital signal of least significance is present on the output lines 2–5. A "0" is represented, in a particular embodiment, by a −24 volt signal, and a "1" is represented by a −1 volt signal. For example, in FIG. 1, a value of 9 is shown as the least significant digit. This would be represented by a "1" signal on each of the lines 2–5. Similarly, the digital signal of next significance is represented by a combination of voltages on output lines 6–9. The digital signal of intermediate significance is represented by a combination of voltages on the output lines 10–13. The more significant digital signals are represented by a combination of signals on lines 14–17 and 18–21, while the most significant digit has been shown as including only a single output line 22 representing either a "1" or a "0."

These digital signals are converted to two analog recorder signals by two digital-to-analog converters. While the invention is described herein as using two digital-to-analog converters, it will be apparent that one digital-to-analog converter arranged for developing two analog output signals could be used. These digital-to-analog converters include the transistors 23–43 and 44–64 which are selectively switched by the digital signals to apply a reference voltage to the ladder network including coding resistors, each having a resistance appropriate to the digital code. When a "1" is present on an output line, one of the transistors 23–43 is rendered conductive, thereby applying a reference voltage to the coding resistor connected to the emitter thereof. If a "0" is present on the output line, one of the transistors in the group of transistors 44–64 is rendered conductive, thereby applying ground potential to the coding resistor.

The digital-to-analog converter for the less significant digits includes coding resistors 65–76. These resistors carry appropriate currents from the reference voltage or to ground potential, and in combination with series resistor **72*a* and 3-terminal resistor 94 develop at junction 77 a voltage having a magnitude proportional to the value represented by the digital codes. Each of the resistors 65–76** has an appropriate value in accordance with the digital code. For example, for the 1–2–2*–4 code used in the embodiment of FIG. 1, the following values may be assigned to each of the resistors 65–76, respectively:

| | Megohms |
|---|---|
| **65** | 5 |
| **65*a*** | 5 |
| **66** | 2½ |
| **67** | 2½ |
| **68** | 1¼ |
| **69** | ½ |
| **70** | ¼ |
| **71** | ¼ |
| **72** | ⅛ |
| **72*a*** | 9/20 |
| **73** | ½ |
| **74** | ¼ |
| **75** | ¼ |
| **76** | ⅛ |

Resistor **72*a*, having a value of 9/20 megohm, is provided in series to attenuate the effect of switching in the least significant digit and in the next digit with respect to the effect of switching in the digit of intermediate significance. In accordance with well-understood principles in this type converter, it has been found convenient to omit the series resistor for attenuating the effect of just the least significant digit. Instead resistors 65–68** have a value ten times that which they would normally have. For the effect of this digit on the fine pen the resistors of higher value need not be as accurate as the lower value resistors.

The values of resistors 78–89 are similarly coded in accordance with the 1–2–2*–4 digital code. In the embodiment being described, the values of resistors 78–89 will be the same as those given above for the resistors 65–76, respectively. Resistor 90, which is associated with the units digit, has a value of ⅛ megohm. Series resistors **85*a* and 89*a*, having values of 9/20 and 3/40 megohms respectively, are included to appropriately attenuate the effect of switching in digits of less significance. The voltage applied by the transistors to the resistors 78–90 produce a coarse recorder signal at the junction 91 for driving the coarse pen of the two-pen recorder 92**. It should be noted that the signal from the digit of intermediate significance feeds only one set of transistor switches but these switches feed two sets of resistors.

The coarse recorder signal is applied to the two-pen recorder 92 through 3-terminal resistor 93 which is provided to adjust the voltage to effect the desired length of travel path for a given fluctuation in the variable. Similarly, the recorder signal for the fine recording pen is applied to two-pen recorder 92 through 3-terminal resistor 94. By proper adjustment of 3-terminal resistors 93 and 94, there is obtained the desired analog centesimal relationship between the two recording pens.

It is an important aspect of the present invention that the digital signal of intermediate significance, as appearing on output lines 10–13, is applied to both digital-to-analog converters. That is, the transistors 31–34 and 52–55 are selectively connected to resistors 73–76 in the digital-to-analog converter for the fine recording pen. They are also connected to resistors 78–81 in the digital-to-analog converter for the coarse recording pen. This dual use of the digital signal of intermediate significance provides a more informative and more readily interpreted record, as will be subsequently shown. The details of two-pen recorder 92 will be further described in conjunction with FIG. 3.

Referring now to FIG. 2, there is shown another embodiment of the invention which takes the form of a frequency recorder for recording the value and changes in the value of power line frequency. The input variable, in this case power line frequency, is applied to frequency meter 201 which produces a digital output indicative of the value of this frequency. The frequency meter 201 may be, for example, the system described in Digital Methods for the Measurement of Power Systems Frequency and Time Error by D. W. Turrell, a paper presented to the American Power Conference, Chicago, Ill., Spring 1966.

The output of digital frequency meter 201 is a parallel five-digit signal representing frequency. The five-digit signal is applied to digital register 203. Again, an exemplary value of the number in the digital register has been indicated thereon. In this case, a frequency of 60.056 c.p.s. has been indicated. In a manner similar to the FIG. 1 embodiment, each of the digits is represented in a 1–2–2*–4 code. The least significant digit is represented by a "1" or a "0" on each of the output lines 204–207. If a "1" appears on these lines, the transistors 208–211 are turned on; whereas, if a "0" appears on the lines, the transistors 212–215 are turned on. The transistors 208–211, when conductive, will apply a reference voltage to the coding resistors 216–219. If the transistors 212–215 are conductive, ground potential is applied to these coding resistors 216–219. Except for one special connection, which will subsequently be described, each of the four output lines of each of the other digits are similarly connected to two transistors, one or the other of which will be rendered conductive by the signal on the output line. The voltages for the digit of next-to-the-least significance are applied to coding resistors 220–223. The coding resistors 216–223, with the aid of the special connection, form a digital-to-analog converter which generates a recorder signal at point 224 representative of the value of the least significant digit and next more significant digit, or the digit of intermediate significance. This signal is applied through 3-terminal resistor 225 to the two-pen recorder 226.

The voltages associated with the digit of most significance and with digits through and including the digit of intermediate significance, are applied to another ladder network of coding resistors including the resistors 227–239. One of the two transistors connected to each of these resistors will be selectively rendered conductive to apply voltage to coding resistors to generate a coarse recorder signal at point 243 which is applied through 3-terminal resistor 244 to the two-pen recorder 226.

The resistor at 240, which separates the two most significant digits, is of a value which is different from the resistor described in conjunction with the digital voltmeter.

In the type of frequency meter producing a digital output which is shown in FIG. 2, it is necessary to connect only one of the four outputs from the register containing the most significant digit. The reason that only one output, namely, the "4" output, need be connected, is that the recorder in this embodiment is required to record only over a limited range, never below 50.000 nor above 69.999 c.p.s. When the frequency is in the range 59.999 c.p.s. or less, the output line 241 will have a "0" thereon. When the frequency is in this range, the transistor 242 is rendered conductive, thereby applying ground potential to the top end of resistor 239. When the frequency is exactly 50.000 c.p.s., there will be no voltage applied to the point 243 and the coarse recorder pen will be at the left-hand margin of the chart. When the frequency is in the range 50.001 to 59.999 c.p.s., the less significant digits will apply voltage to the point 243.

When the frequency has a value of 60.000 to 69.999 c.p.s. inclusive, the "4" output line of the most significant digit, i.e., the output line 241, has a voltage thereon representing a "1." When the output line 241 has a "1" voltage thereon, the transistor 242*a* is rendered conductive, thereby applying 6.8 volts to the top end of resistor 239. In this range, additional voltage may be applied to the point 243 by the less significant digits if they are other than zero.

In order to provide a fine recorder scale which is folded about a value other than .000, one special connection is used which includes the transistor 245 and associated circuitry. The term "folded" as used herein will be better understood with reference to FIG. 2*d*. If, instead of the special connection involving transistor 245, a standard connection had been used in FIG. 2, the fine scale of FIG. 2*d* would start at .000 on the lefthand side and progress to .099 on the right-hand side. For a power line frequency recorder in accordance with this embodiment, the frequency often fluctuates from slightly below to slightly above 60.000 c.p.s. If the fine scale has a value of .000 on the left-hand side, the fine pen often would be crossing from one side of the chart to the other. For this reason, in many applications it is desired to have the left-hand scale value be other than .000; i.e., it is desired to fold the scale about a value other than .000. As shown in FIG. 2*d*, the scale is folded about .060. In FIG. 2*d* the scale has been labeled Hz., which is an abbreviation for hertz. A hertz is one cycle per second.

Referring back to FIG. 2, there can now be explained the manner in which the transistor 245 and associated circuitry provides folding about the value .060 and thereby gives a smooth transition from 59.999 c.p.s. to 60.000 c.p.s. When the power line frequency increases from just below 60.000 c.p.s. to 60.000 c.p.s. or just above, but less than 60.060, an extra increment of voltage is applied to the junction 224 at which the fine recorder signal is developed. This extra increment of voltage is of a value which will move the fine recorder pen to the right by the desired amount. The extra increment of voltage must be just a little greater than the sum of the voltages removed as the frequency increases from 59.999 to 60.000 c.p.s. The sum of the voltages removed is equivalent to .059 c.p.s., so the extra increment is made to be equivalent to .060 c.p.s. When the value of frequency decreases from 60.000 c.p.s., or just above, to just below 60.000 c.p.s., this extra increment of voltage is removed from the fine recorder signal. In this event, the fine pen records in the area of the chart to the left of .000. In order to do this, the transistor 245 senses the voltage on the .04 line 246 and selectively turns on either the transistor 247 or the transistor 248. This will either apply the 6.8 volts or ground potential respectively to the top of resistor 223.

As an example of operation, consider the recording when the frequency is at a value of 60.000 c.p.s. In this case, the .04 output line 246 has a "0" thereon as do all of the less significant digit output lines. The "0" value, which is a negative voltage, is applied to the base of transistor 245, thereby turning that transistor off. In this case, a positive voltage is applied to the bases of transistors 247 and 248. This positive voltage will turn transistor 247 on, thereby applying positive voltage to the top of resistor 223. This will apply a first extra increment of voltage to the junction 224 just sufficient to develop a fine recorder signal of sufficient magnitude to position the fine recording pen at the .000 position on the scale of FIG. 2*d* which is well to the right of the left side limiting position for this pen. As the frequency increases slightly, this first extra increment of voltage will continue to be applied to the junction 224 and additional increments of voltage will be applied from the aggregate effect of the less significant digits.

Now consider what happens when the frequency drops from 60.000 c.p.s. to 59.999 c.p.s. The output lines 246, 250, 251, 252 and 204, 205, 206, 207 all have changed from "0's" to "1's." The "1" value on line 246, near zero voltage, renders the transistor 245 conducting, thereby applying a negative voltage to the bases of transistors 247 and 248. In this case, the transistor 248 in rendered conducting, thereby applying ground potential to the top of resistor 223. The first extra increment of voltage is removed. Its value is equivalent to .060 c.p.s. which is slightly greater than voltages restored (equivalent to .059 c.p.s.). The voltage at junction 224 is reduced and the pen is moved just to the left of the .000 mark on the scale.

Consider now what happens when the frequency decreases further to a value of 59.960, which is the lowest value which can be recorded by the fine recorder pen on the left-hand side of the scale. The next to least significant digit, .-6-, will be indicated by a "1" on output lines 246 and 250. Output lines 251, 252, 204, 205, 206, 207 will all be at "0." Since there is a "1" on line 246, the transistor 245 is still conducting and, as a result, the transistor 248 is turned on so that ground potential is applied to the top of resistor 223. However, as the frequency decreases further to a value of 59.959, the output line 246 switches to a "0" and the lines 251, 252, and 204–207 all switch to "1's." When a "0" is on the line 246, the transistor 245 is cut off, thereby applying positive potential to the bases of transistors 247 and 248. Transistor 247 is rendered conductive thereby applying the first extra increment of voltage to the junction 224. This first extra increment of voltage moves the fine recorder pen a distance equivalent to .060 c.p.s. The switching to "1's" of lines 251, 252, 204–207 adds increments of voltage which move the fine recorder pen by a distance equivalent to .039 c.p.s. The aggregate movement of the fine recorder pen is equivalent to .099 c.p.s. When this occurs, the fine recorder pen will cross from the left-hand side of the scale 99 divisions toward the right-hand side of the scale coming to rest 59 divisions to the right of .000, there to continue recording values of frequency.

Now, consider what happens when the frequency increases above 60.000 c.p.s. At 60.000 c.p.s., the transistor 247 is conductive, thereby applying the first extra increment of voltage to the junction 224. As the frequency increases further, less significant output lines 250–252 and 204–207 will be selectively switched to the "1" condition, thereby applying increments of voltage to the junction 224, the aggregate of which continues to increase thereby driving the fine recorder pen further to the right. This continues to a value of frequency of 60.059 c.p.s. When the frequency increases to 60.060 c.p.s., the output line 246 will be switched to a "1," thereby cutting off the transistor 247 and turning on the transistor 248. This will remove the first extra increment of voltage from the signal at the junction 224 equivalent to .060 c.p.s. Also, lines 251, 252 and 204–207 will be switched to "0's" thus removing the signal at junction 224 equivalent to .039 c.p.s. The aggregate effect is, therefore, equivalent to a decrease of .099 c.p.s. so the fine recorder pen will move toward the left-hand side of the scale by 99 divisions.

In the recorder which has just been described, the fine recorder pen crosses from one side of the scale to another for a change of frequency as small as .001 c.p.s., and the pen may have to cross back on the next measurement if the critical gap in frequency has been crossed. The critical gap is – –.–59 to – –.–60. There are 100 such gaps between 55 and 65 c.p.s., specifically 55.059 to 55.060, 55.159 to 55.160, etc. However, in the subsequent description, the more significant digits 59.0– – will be used as illustrative.

A record of frequency, where the frequency is varying across the critical gap for the fine recorder pen, will be confused and somewhat difficult to read because the chart will be painted with ink. In accordance with another aspect of the present invention, the modification shown in FIG. 2*a* is provided to prevent frequent crossing of the fine recorder pen from one side of the scale to another when the frequency is varying on both sides of a particular point; for example, when the frequency is varying above and below 59.060 cycles per second. In order to accomplish this, the chart-marking path, or span, of the fine recorder pen is extended.

Referring now to FIG. 2*a*, there is shown a modification of the invention which adds a second extra increment of voltage to the fine recorder signal when frequency changes from 59.059 c.p.s. to 59.060 c.p.s. By adding this second extra increment of voltage at this point, the fine recorder pen is allowed to continue to record increased frequencies at the right-hand side of the chart to 59.999 c.p.s. without crossing back to the left-hand margin at this point.

The circuitry shown in FIG. 2*a* is to some extent repetitive of that shown in FIG. 2 and like reference numerals have been applied to like components. Note that the .04 output line 246 of the next to least significant digit is shown in FIG. 2*a*. Also, the transistor 245 and the transistors 247 and 248, previously described in conjunction with FIG. 2, have been repeated in FIG. 2*a*.

The modification to the circuit of FIG. 1 to that shown in FIG. 2*a* resides in the provision of a switch 260 across transistor 264 and switching transistors 261 and 262 which can selectively apply a second extra increment of voltage to the junction **224*a***.

The switch 260 is opened and closed by travel of the fine recorder pen. In the embodiment to be described, the switch 260 is closed when the fine recorder pen is to the left of a position indicating .030 c.p.s. and the switch is open when the fine recorder pen is to the right of that position. However, the exact point at which the switch is actuated is not significant. Furthermore, while the switch 260 has been shown as a mechanical switch actuated by travel of the fine recorder pen, it will be understood that the switch could be an electronic switch, such as a transistor. This electronic switch could be actuated by the history of the digital input signal with respect to a critical value, or it could be actuated from the analog recorder signal when it moves through a critical value. This critical value can be any value representative of a fine pen position located in the portion of the normal chart-marking path which is not duplicated in the extended chart-marking path. This portion of the normal chart-marking path, not duplicated in the extended chart-marking path, is also referred to as a common section. The common section comprehends all values of the digital signal for which duplicate positions for the fine recorder pen are not available.

The history of the digital input signal wtih respect to a critical value can be used to actuate an electronic switch by setting a bistable switch into a first state when the digital signal is representative of a value in the common section less than the critical value and by setting the bistable switch into a second state when the digital signal is representative of a value in the common section greater than the critical value.

In the example shown, the switch 260 is actuated by the fine recorder pen at .030 c.p.s., but it could be actuated at any position in the range .000 c.p.s. to .059 c.p.s. Therefore, in the appended claims, the language that the switching means is actuated when the fine chart-marking means is below a particular position is intended to cover all such embodiments, whether the switch is actuated by recorder travel, is actuated by sensing the history of the digital input, or is actuated by sensing the analog recorder signal.

The foregoing can be better understood with reference to FIGS. 2*b* and 2*c* which must be viewed contiguously. FIG. 2*b* shows the fine recorder scale. This scale represents, in simplified form, the actual recorder scale which is shown, for example, in FIG. 4*a*. Note, in FIG. 2*b*, that the scale has been extended above .060 c.p.s. to accommodate an extended chart-marking path of the fine recorder pen. In FIG. 2*b*, the portion of the scale from .060 at the left through .000 to .059 c.p.s. can be considered as the normal chart-marking path and the portion of the scale from .060 at the right to .099 c.p.s. at the right can be considered as the extended chart-marking path. As used herein, the term "normal chart-marking path" is the minimum path required to record the entire range of the input variable. While in the particular example the normal chart-marking path is .060 to .059 c.p.s., it will be understood that various other arrangements could be used. For example, the normal path could include the values .000 to .099 c.p.s. and the extended path could include values from .000 to .039 c.p.s.

Considered another way, the section of the chart-marking path in FIG. 2*b* which extends from .060 on the left to .059 on the right is a first normal region and the section from .000 to .099 c.p.s. is a second normal region. Each normal region can record all values of the input variable which are required to be recorded by the fine recording pen. In FIG. 2*b* the common section from .000 to .059 is included in both the first normal region and in the second normal region. The first region also includes an adjacent first section, which in FIG. 2*b* is the section from .060 to .099 at the left side of the scale. The second region includes the common section and a second adjacent section which is from .060 to 0.99 at the right side of the scale. Note that the values recorded in both the adjacent first section and the adjacent second section are the same. It is important to consider the chart divided in this manner because when the first normal region, i.e., from .060 to .059, is considered to be the normal region, then the adjacent second section, from .060 to .099 is the extension. Conversely, when the second normal region, i.e., from .000 to .099, is the normal region, then the adjacent first section, i.e., from .060 to .099, is the extension.

FIG. 2*c* shows the range of the fine recorder pen in which the switch 260 is closed and the range in which it is open. As shown in FIG. 2*c*, the switch is closed when the fine recorder pen is at .030 c.p.s. or to the left, and is open when the pen is to the right of .030 c.p.s. up to the limit, which in this embodiment is .099 c.p.s.

Now, consider the operation of the recorder, as modified in FIG. 2*a*, when the frequency increases from a value of 59.059 c.p.s. to a value of 59.060 c.p.s.

Referring to FIG. 2*a*, at 59.059 c.p.s., the output line 246 has a"0" thereon. With the circuit of FIG. 2*a*, the "0" on line 246 puts this line at a negative voltage and this renders the transistor 245 non-conducting. The resulting positive voltage at the collector of transistor 245 renders the transistor 247 conductive, thereby supplying the extra increment of voltage through the resistor 223 to the junction 224. This increment of voltage and the circuit for supplying it to junction 224 is the same as in FIG. 2. Its effect is equivalent to .060 c.p.s. As the frequency increases from 59.059 c.p.s. to 59.060 c.p.s. the output line 246 goes to "1" and the .060 increment is removed. Also removed are the six voltage components switched off by output lines 251, 252, 204, 205, 206, 207, the aggregate effect of which is equivalent to .039 c.p.s. In order that the fine recorder pen may continue to move in a small increment to the right, it is necessary at the same time to add a second extra increment of voltage and this second extra increment must be equivalent to .100 c.p.s.

In order to supply this second extra increment of voltage, transistor 264 and the asscciated circuits shown in FIG. 2*a* have been added. When the line 246 switches from a "0" to a "1" at the transition from 59.059 to 59.060 c.p.s., the transistor 264 is cut off. Note that at this time the switch 260 is open as is shown. When the transistor 264 is cut off, a positive voltage is applied to the bases of transistors 261 and 262. This positive voltage turns transistor 261 on, thereby applying 6.8 volts to the top of resistor 263. The resistor 263 has an effect in conjunction with resistor **223*b*, such that the second extra increment in voltage applied to the junction 224*a* is equivalent to .100 c.p.s. Because this second extra increment of voltage is applied to the junction 224*a*** at this time, the fine recorder pen will not cross back to the left-hand side of the scale, but, rather, will move to the right by one division equivalent to .001 c.p.s.

As the frequency increases further by small increments, the pen will continue to move toward the right in the extended chart-marking path. Specifically, referring to FIG. 2*b*, the pen will record in the range .060 c.p.s. to .099 c.p.s. on the right-hand side of the scale. Note that this range is redundant with the same range on the left-hand side of the scale. That is, when frequency has a value between .060 and .099, it can be recorded either on the left-hand or right-hand side of the scale so a decision is required. This decision is made by the recorder actuated switch 260 in FIG. 2*a*. Frequencies in the range .060 to .099 c.p.s. are recorded in the extended chart-marking path on the right-hand side of the scale when the switch 260 is actuated to its open position. Frequencies in the range .060 to .099 c.p.s. are recorded in the normal chart-marking path at the left-hand side of the scale when the switch 260 is actuated to its closed position.

Consider, now, the operation when the fine recorder pen is upscale; i.e., to the right of the .030 c.p.s. scale position. The switch 260 is open. When the frequency decreases from 59.060 to 59.059 c.p.s. the output line 246 switches from a "1" to a "0." Line 250 does not switch and lines 251, 252, 204, 205, 206, 207 switch from "0" to "1." Through the action of line 246 and transistors 245 and 264, transistor 261 is turned off thus removing the second extra increment of voltage which is equivalent to .100 c.p.s. At the same time, through the action of line 246 and transistor 245, transistor 247 is turned on thus supplying the first extra increment of voltage which is equivalent to .060 c.p.s. At the same time, through the action of lines 251, 252, 204, 205, 206, 207 and their associated transistors, increments of voltage are added which have an aggregate effect which is equivalent to .039 c.p.s. The net result of all of these actions is to reduce the voltage to the fine recorder pen by the equivalent of only .001 c.p.s. Therefore, the fine recorder pen moves left by .001 c.p.s. and continues its smooth transition downscale.

As the frequency decreases further through 59.030 c.p.s., the switch 260 is closed but since transistor 264 is conducting, the switch closure has no effect at this time. As the frequency decreases from 59.000 to 58.999 c.p.s., the output line 246 switches from a "0" to a "1." This action working through transistor 245 cuts off the transistor 247, as has previously been described with regard to the FIG. 2 embodiment. However, note that the switching of output line 246 from a "0" to a "1" does not change the conducting condition of transistor 261. The reason for this is that the switch 260 is closed at this time, thereby continuing to apply a negative voltage to the base of transistor 261 in spite of the fact that the transistor 264 has been made nonconducting. The operation of the recorder as the frequency decreases below 58.999 c.p.s. is the same as that previously described in conjunction with FIG. 2.

Now, consider the operation of the FIG. 2*a* modification when the frequency increases from 59.099 c.p.s. with the fine recorder pen at the right side of its chart-marking path. At a frequency of 59.099 c.p.s., the line 246 has a "1" value thereon. In response to this, transistor 261 is on, thus supplying the second extra increment equivalent to .100 c.p.s. and transistor 247 is off, thus having removed the first extra increment equivalent to .060 c.p.s. As the frequency increases to 59.100 c.p.s., the lines 246, 250, 251, 252, 204, 205, 206, 207 (FIG. 2) all switch from "1" to "0." In response to line 246, transistor 261 (FIG. 2*a*) is switched off removing the second extra increment equivalent to .100 c.p.s. Also in response to line 246, transistor 247 is switched on thus supplying the first extra increment equivalent to .060 c.p.s. In response to lines 250, 251, 252, 204, 205, 206, 207, increments are removed whose aggregate effect is equivalent to .059 c.p.s. The net result of all these actions is to reduce the voltage to the fine recorder pen by the equivalnt of .099 c.p.s. This voltage at the junction 224 moves the fine recording pen back to a point on the scale indicating a value of .000. Note that the pen does not cross all the way back to the left-hand margin. Forty divisions of the chart-marking path are available to the fine recording pen for decreases in frequency without necessitating any cross back toward the right side. As a result of this condition, frequent crossing of the chart by the fine recording pen is avoided. Confusion of the record is avoided. The record is clearer and more lucid.

In one embodiment of the invention, typical values for resistors 223 and 263 which will provide the proper coding are ⅛ megohm for each resistor. The resistors 223*a* and 223*b* have a value of 1/24 megohm.

There are also many modifications of the circuitry for adding the first and second extra increments of voltage. One of the several modifications is shown in FIG. 2*e* which shows all corresponding components of FIG. 2*a* with like reference numerals. In the FIG. 2*a* embodiment, when the digital input switched from a value of .059 or below, to a value of .060 or above, the first extra increment of voltage was removed from the recorder signal by turning off transistor 247 and the second extra increment of voltage was added to the recorder signal by turning on transistor 261. Instead of switching off the first extra increment at this time, the circuit can be modified so that the first extra increment of voltage remains and a second extra increment of voltage is added. In this case, the second extra increment of voltage will be smaller than that which was added in the FIG. 2*a* embodiment.

In FIG. 2*e*, the diodes 265 and 266 together with the biasing resistor 267 form an OR circuit which is connected to turn transistor 247 on to add the first extra increment when either one of two conditions exist. First, the transistor 247 can be turned on from the .04 input, that is, through transistor 245, as in the FIG. 2*a* embodiment. When the transistor 245 is turned on by the line 246 being switched to the "off" state, then the transistor 247 is turned on. The transistor 247 may also be turned on through the diode 266 by the same signal which is applied to the base of transistor 261. This signal causes transistor 261 to be conducting and is applied through diode 266 to turn the transistor 247 on. That is, just beyond the common section, at the value .060 in FIG. 2*b*, the transistor 261 will be rendered conducting, thereby adding a second extra increment. Also, at the same time, the transistor 247 will be rendered conducting through the diode 266. Actually, transistor 247 will merely remain conducting because previously it had been rendered conducting through diode 265. It is not necessary to include the resistor 223*b* in the FIG. 2*e* modification. Also, the value of resistor 263*a* will be different from the value of resistor 263 used in the FIG. 2*a* embodiment so that the second extra increment is smaller than in the FIG. 2*a* embodiment. Specifically, since resistor 223 corresponds to .060 c.p.s. and resistor 263*a* corresponds to .040 c.p.s., the conductance of resistor 263*a* must be only .040/.060 that of the conductance of resistor 223.

Other modifications of the invention are possible and two will be outlined briefly. The first is an analog-centesimal recorder for power line frequency with the scale for the fine pen folded around .040 c.p.s. The second is an analog centesimal recorder for power line frequency with the scale for the fine pen extending from .040 c.p.s. upward for more than 100 divisions.

The recorder with fine scale folded around .040 c.p.s. uses a circuit very similar to that of FIG. 2. FIG 2 uses in a normal way output line 250, and uses in a special way output line 246. The modified recorder with scale folded around .040 c.p.s. uses in a normal way output line 246, and uses in a special way output line 250. This is possible since output line 246 is at "0" from .000 c.p.s. up to and including .059 c.p.s., and at "1" from .060 c.p.s. up to and including .099 c.p.s. Used in a normal way, it switches an increment of voltage to the fine pen equivalent to .040 c.p.s. Output line 250 is also at "0" at .000 c.p.s. but it only stays at "0" up to and including .039 c.p.s., and is at "1" from .040 c.p.s. up to and including .099 c.p.s. Used in a normal way, it switches an increment of voltage to the fine pen equivalent to .020 c.p.s. Output line 250 can be referred to as the 2* line to distinguish it from output line 251 normally referred to as the 2 line.

When the output line 250 is used in the special way involving transistor 245, as shown in FIG. 2*a*, it must supply a first extra increment of voltage to the fine pen equivalent to .080 c.p.s. This requires that resistor 223*a* be replaced with a resistor of different value.

The second modification (which is a frequency recorder with the scale for the fine pen extending from .040 c.p.s. upward for more than 100 divisions) includes the modifications just described to get folding around .040 c.p.s. It also includes the circuit of FIG. 2*a* with output line 246 replaced with output line 250. Resistor 223*a* would be replaced by a resistor of different value and resistor 223*b* would be replaced by a resistor of different value. The switch shown in FIG. 2*c* should, preferably, be actuated at .020 c.p.s. since this is midway between the bottom and top of the scale for the fine pen.

Since this recorder has the fine chart-marking path extended by an amount equivalent to .060 c.p.s., the recorder will tolerate frequency fluctuations as great as .060 c.p.s. without superfluous crossings of the chart by the fine pen.

Of course, it will be understood that the range can be extended to a different desired value on the left or on the right by making use of appropriate digital logic, analog networks including resistors, and switches actuated by the recorder or the recorder signal or the history of the digital input signal.

Referring to FIG. 3, there is shown the two-pen recorder and associated circuitry. The fine recorder signal, developed by either the digital-to-analog converter shown in FIG. 1 or that shown in FIG. 2, is applied to the input terminal 301, while the coarse recorder signal is applied to input terminal 302.

If the digital input signal is essentially continuous, a direct connection can be made between each digital-to-analog converter and the corresponding recorder input. Specifically, referring to FIG. 3, a connection can be made from terminal 301 to terminal 301*a*, and a connection can be made from terminal 302 to 302*a*. By essentially continuous input signal is meant that the time for change of the input signal is negligible compared to the time of dwell for the input signal.

Because many digital input signals are not essentially continuous, some means is required to prevent spurious changes in the input signal from producing spurious changes in the fine recorder input signal and coarse recorder input signal. To prevent this, the recorder input terminals are disconnected from the outputs of the digital-to-analog converters during the periods when there is a chance for spurious changes in these outputs. In order to make these disconnections, relays are used.

The fine recorder signal is applied through contacts 303 of a relay which is closed only after a period when chance for spurious changes in the digital input signal has passed and before chance for further spurious changes in the digital input signal has returned. The time of contact closure may be called the recorder balancing period. The period when the contacts are open may be called the recorder hold period. The signal to energize the coil of this relay during the desired period will be subsequently described.

The fine recorder signal is then applied to terminal 301*a* and the network including resistors 304 and 305 and capacitors 306, 307 and 308. Capacitors 306, 307 and 308 serve to hold the voltage input to the recorder during the period when contacts 303 are open. The fine recorder signal is converted to AC by the modulator which has been diagrammatically shown as being of the electromechanical type in which the contact 309 is actuated to its two positions successively. As is well known, the electromechanical modulator may be replaced by an electronic type modulator. The AC signal indicative of the fine recorder signal is applied to the primary of transformer 310, the secondary of which is connected to amplifier 311 which drives the recorder motor 312. The recorder motor 312 positions the fine pen 313 in its chart-marking path transversely of the moving chart 314 in correspondence with the magnitude of the fine recorder signal.

In accordance with standard recorder drive techniques, the recorder motor 312 is part of a self-balancing network which includes the slidewire 315 whose contact is moved in correspondence with movement of the recorder pen 313. There is developed at the contact of slidewire 315, a balancing voltage which is connected to the center of the primary of transformer 310. The operation of the self-balancing network is such that the fine recorder pen 313 is constantly positioned in accordance with the magnitude of the fine recorder signal.

The coarse recorder signal is similarly applied through contacts 316, terminal 302*a*, resistor-capacitor network 317 and electromechanical modulator 318 to the primary of transformer 319. The coarse recorder signal is coupled through amplifier 320 to the drive motor 321 for the coarse recorder pen 322. The coarse recorder pen motor 321 is also part of a self-balancing network including the slidewire 323.

In the type of digital circuits under consideration, there are periodic changes often accompanied by spurious changes in the digital input signal as previously described. During these spurious changes in the digital input signal, the analog signal at the output of the digital-to-analog converter will have spurious changes which should not be recorded. For this reason, it is desirable to apply the fine and coarse recorder signals to the two-pen recorder only during intervals when the digital input signals are stabilized. In order to accomplish this, a relay 324 having the contacts 303 and 316 has been provided. This relay coil 324 is energized for the desired length of time by a circuit 330 shown in FIG. 3. This circuit includes transistors 326 and 327 connected as a monostable multivibrator together with variable resistor 328 and transistor 329. This circuit gives an output pulse, the duration of which is determined by the value of the electrical elements used as understood by those skilled in the art. For the embodiment of the frequency recorder, the duration of this pulse is approximately 0.7 second. This pulse is initiated by application of a triggering pulse to terminal 325. The triggering pulse must be received after the period when there is a chance for spurious changes in the input signal. Such a triggering pulse at the desired time is available from the digital frequency meter. It is timed to occur after completion of the conversion which is a counting operation. The counting operation is a source of spurious changes in the digital input signal. Therefore, the relay coil must not be energized until after the counting has been completed. This triggering pulse from the digital frequency meter has been elsewhere used as a print command pulse. For other embodiments where pulse lengthening is not required, the circuit 330 may be simplified.

Referring now to FIG. 4, there is shown an example of a record which might be produced by the recorder of FIG. 1. This shows the recording of a voltage which is constant at a value of 1.01919 volts between the points 451 and 452. The three least significant digits can be read with high precision from the fine record and the four most significant digits are read from the coarse record on the left-hand side of the chart. Although it is quite difficult to accurately read the digit . – –9 from the coarse record, it is very easy to read this digit as 9, it being the most significant digit in the fine record. This digit, which contributes to the fine recorder signal and the coarse recorder signal, has been referred to as the digit of intermediate significance.

Between the points 452 and 453, the voltage is decreasing at a very slow rate as shown by the fine pen record. Between these two points, representing one unit in time, the voltage has decreased from 1.01919 to 1.01909. Thus, it can be seen that a rate of change of .0001 volt per unit of time can be read. If this rate of change of voltage were to continue, there would be required 10,000 units of time for the voltage to reach zero. All of this would be recorded completely and automatically.

At the point 453, there is initiated a much more rapid decay of the voltage which can best be seen at 453*a* on the coarse pen record. From the point 453*a* onward, there is shown this rapid exponential decay of voltage which might, for example, accompany the discharge of a capacitor. The rate of change as determined by the slope of the coarse pen record at 453*a* is 1.0 volt per unit of time. For the purpose of clarity, many of the fine recorder lines have been deleted, although it will be understood that the fine recorder pen will be traversing rapidly across its chart width during this time. At the point 454, which is approximately the half voltage point in the exponential curve, the rate of change of voltage is .5 volt per unit of time. At the point 455, which is approximately the quarter voltage point in the exponential curve, the rate of change of voltage is .25 volt per unit of time. Thus, it can be seen that the rate of change of voltage can be determined quite accurately even when the voltage is decreasing very rapidly. Furthermore, as the rate of decrease becomes less rapid, thereby making it difficult to determine the rate of change from the coarse record, the rate of change can still be determined quite accurately from the fine record. Referring to the right-hand side of the chart, the curve 456 is the 102nd traverse of the fine pen subsequent to the initiation of the rapid decrease at the point 453. At the point 457, the rate of decrease is .005 volt per unit of time. At the point 458, the rate of decrease is .0025 volt per unit of time. Therefore, it can be seen that even at very small rates of decrease, approximately 100 times smaller than the earlier rapid rate of decrease at point 455, the change can be determined quite accurately.

Referring now to FIG. 4*a*, there is shown a record of oscillator frequency which is an example of that which may be produced by the frequency recorder of FIG. 2*a*. The record of FIG. 4*a* depicts a situation in which the power line frequency is decreasing from a value above 60 c.p.s. to a value which is slightly below 60 c.p.s. In FIG. 4*a* both pens have been shown as recording on the same section of the chart so that the records cross. This can be accomplished by proper setting of the 3-terminal resistors 225 and 244, shown in FIG. 2, and by having one pen displaced slightly along the length of the chart from the other pen. Alternatively, means can be provided to make one pen jump over the other, or to momentarily produce displacement along the length of the chart at the time of crossing. While the mark left by the coarse pen has been shown as a broad smooth line in FIG. 4*a*, it will be understood that in actual practice the line is much thinner and has many small excursions.

Referring to one of the initial times shown on the record, the mark left by the coarse pen is indicated at 401 and that of the fine pen at the corresponding time is indicated at 402. The value of frequency at this time is determined by first reading the value of the fine pen. At the point 402, the fine pen indicates a value of .–50 c.p.s. At this time, the coarse pen indicates a reading of $60.6_6$ c.p.s. The subscript 6 is a visual estimate of the digit of intermediate significance which in this embodiment is hundredths of a c.p.s. The two readings considered together revise the estimate on the digit of intermediate significance and indicate the frequency at this time is 60.650 c.p.s. The frequency is decreasing so that at the time when the fine pen is at point 403, a frequency of 60.624 c.p.s. is recorded. At the point 404, a frequency of 60.600 is recorded. At the point 405, a frequency of 60.570 is recorded. As the frequency falls further, the last frequency to be recorded by the fine pen on the left side of the chart is at 406 indicating a value of 60.563. The next value of frequency is less than 60.560 c.p.s. Since values below 60.560 cannot be recorded at the left side of the chart, the pen is moved to the right side of the chart to record, at the point 407, a value of 60.557. Note that the fine recorder pen moves to the right side of the chart automatically in response to a change in the digits of less significance. These digits are applied to the digital-to-analog converter to produce a recorder signal which drives the recorder in the conventional manner. Because of this, it is not necessary to provide special limit switches at the end of the range, or other means which are often used to switch the pen from side-to-side in conventional recorders. At the point 407, the frequency increased very slightly so that at the point 408 a value of 60.570 was again recorded. It is important to note that the frequency value 60.570 can be recorded on either the left or the right side of the chart. Because it can be recorded on either side, the pen did not cross back to the left-hand side of the chart in recording the value at the point 408. Rather, the fine pen remained on the right-hand side of the chart to record this value. As time progresses, the frequency decreases further so that the pen remains on the right-hand side of the chart to record, at the point 409, a value of 60.551 c.p.s.

At the point 410, the frequency recorder registers a value of frequency of 60.510. In arriving at the value of 60.510 c.p.s., the digit of intermediate significance is obtained from the position of the fine pen. At this time, the coarse pen at 411 is almost exactly on the division line indicating a frequency of $60.5_0$ c.p.s. At a subsequent instant, the fine pen records, at the point 412, a reading of .–99 c.p.s. Note that at this time, the coarse pen, as indicated at 413, is still on the division line indicating a value of $60.5_0$ c.p.s. Even though the coarse pen is on the same division line during this time, there is no question as to the reading, which is 60.499 c.p.s. Although the value of the digit of intermediate significance, estimated from the coarse pen, is .–0 c.p.s., the actual value of this digit as recorded by the fine pen is .–9 c.p.s., therefore, the estimated value of $.5_0$ c.p.s. must be replaced by .49 c.p.s. The replacement of the $.5_0$ c.p.s. by .49 c.p.s. involves the same mental process as is used in telling time from a clock. The fine pen provides important information which is necessary to correctly interpret the reading of the coarse pen.

The foregoing demonstrates the great advantage of using the intermediate significance digital signal to derive both the fine and the coarse recorder pen signals. It is because of this redundancy that the recorded value of the frequency can be uniquely determined with high resolution.

The frequency continues to decrease. Referring to the end of the portion of the record shown in FIG. 4*a*, the fine pen has registered a value at the point 414 while the coarse pen has registered a value at the point 415 at the same instant of time. The fine pen at the point 414 registered a value of .–03 c.p.s. At this instant of time, the coarse pen, at the point 415, registered a value of $60.0_0$ c.p.s. The two readings taken together indicate the frequency of 60.003 c.p.s. In this case, no change from the value estimated from the record of the coarse pen is needed.

At a subsequent instant of time, as indicated by the fine pen registration at the point 416 and the coarse pen registration at the point 417, the fine pen registers a value of .–97 c.p.s. The coarse pen at the point 417 still registers a value of $60.0_0$ c.p.s.These two readings taken together are readily interpreted as indicating a value in frequency of 59.997 c.p.s. Note, first, that a decrease in frequency of only .006 c.p.s. has been accurately recorded. Note, secondly, that even though the coarse pen registers a value of $60.0_0$ c.p.s. at both the points 415 and 417 and that the fine pen registers a value of .–03 c.p.s. at the point 414 and a value of .–97 c.p.s. at the point 416, there is no problem of correctly interpreting the frequency at these two instants as being 60.003 c.p.s. and 59.997 c.p.s., respectively. The reason that there is no difficulty in correctly reading these two values is that the fine pen and the coarse pen have a relationship one to another much the same as the relationship between the minute hand and the hour hand of a clock. When reading a clock, the position of the hour hand is alway read in conjunction with the position of the minute hand. For example, the hour hand may point to a position which is on the hour as close as the eye can determine. However, if the minute hand is registering a value after the hour, the time reading will correctly be interpreted as being so many minutes after the hour. If the minute hand is registering a value before the hour, the time reading will correctly be interpreted as being so many minutes before the hour. A bent or slightly displaced hour hand will not result in erroneous reading provided the displacement does not approach the equivalent of one-half hour.

Now consider the record of FIG. 4*a* as a whole. First, it is immediately apparent to the viewer that frequency is decreasing. This is indicated to the viewer by the path of the coarse pen which is moving from right to left. Furthermore, the rate of decrease is very accurately represented to the viewer by the slope of the record made by the fine pen. Note that at early record times the fine pen traverses from right to left at a rather sharp slope. This indicates a rather rapid decrease in frequency. However, at the latest record time shown in FIG. 4*a*, the fine pen is traversing from right to left with a slope which is less sharp, indicating that the frequency is decreasing at a slower rate than it had been previously. This change in the rate of frequency decrease could not be easily discerned from the track of the coarse pen. The fine pen is a much better indicator of change in rate of change in frequency because of the analog centesimal relationship between the two pens. Because of the 100:1 relationship between the fine pen and the coarse pen, a change in rate of change which is hardly discernible on the coarse pen may be easily seen from the track of the fine pen. Note that in FIG. 4*a*, the interval between 60 and 61 c.p.s. on the scale for the coarse pen is the same as the interval between .00 and .01 c.p.s. on the scale for the fine pen, showing the 100:1 relationship.

The chart of FIG. 4*a* also provides a good illustration of what is meant by multiple use of the chart width. Note that the fine recording pen occupies the same position on the chart at the point 410 and at the point 418. However, the fine recording pen has made multiple traverses of its chart width between the points 410 and 418. Although the points 410 and 418 are at the same position, they indicate different values. The fine recording pen at the point 410, when read in conjunction with the coarse pen at the point 411, records a value of frequency of 60.510 c.p.s. However, the fine recording pen at the point 418, when read in conjunction with the position of the coarse recording pen at the point 419, records a value of frequency of 60.210 c.p.s.

Another example of the manner in which the present invention produces a more readable or lucid record is shown in FIG. 5. FIG. 5 shows an actual recording of power line frequency. Note, at the point 501 in the fine pen record and at the point 502 in the coarse pen record, a frequency 59.982 c.p.s. is recorded. The power line frequency is fluctuating around this value throughout the record. At the point 503, a value of 59.982 c.p.s. is again recorded. At the point 504, power line frequency has fallen to 59.963 c.p.s. The next recorded value of frequency has dropped below 59.960 c.p.s., the lowest value which can be recorded on the left-hand side of the chart. Therefore, the next recorded value is shown at the point 505 which records a frequency of 59.950 c.p.s. From this point in time, the power line frequency increases, for example, to a value of 59.985 c.p.s. as recorded at the point 506. It is important to note, however, that when the power line frequency increased, the fine recorder pen did not cross back to the left-hand side of the chart but, rather, remained on the right-hand side of the chart to continue to record frequencies which approximate 59.980 c.p.s. For example, at the point 507, a value of 59.982 c.p.s. is again recorded. Subsequently, the power line frequency increases to a value of 59.997 c.p.s., as indicated at the point 508. Subsequent to this, the frequency increases to a value greater than 59.999 c.p.s., the largest value which can be recorded on the right-hand side of the chart. Therefore, at the instant following the recording of the point 508, the fine recording pen crosses back to the left-hand side of the chart to record, at the point 509, a value of 60.001 c.p.s. Subsequently, power line frequency decreases somewhat so that at the point 510 a value of frequency of 59.979 c.p.s. is recorded. Again the frequency fluctuates about the value of approximately 59.99– c.p.s. For example, at the point 511, there is another reading of 59.982 c.p.s.

What is shown in FIG. 5 is the recording of a power line frequency which is somewhat noisy. That is, the frequency is fairly constant around 59.99– c.p.s., but it is fluctuating about this point.

The great improvement in readability and the lack of confusion in such a record can best be demonstrated with reference to FIG. 6, showing a record produced by a recorder not having an extended chart-marking path.

In FIG. 6, there is shown the recording of a frequency which is fluctuating about a mean value of approximately 56.69– c.p.s. For example, at the point 601, a value of 56.678 c.p.s. is recorded. This is determined from a reading of the fine pen at the point 601 of .–78 c.p.s. and from a reading of the coarse pen at the point 602 of $56.7_0$ c.p.s. This indicates that the reading is either slightly above or slightly below $56.7_0$ c.p.s. However, since the reading of the fine pen at the point 601 is .–78 c.p.s., the frequency at this point is immediately interpreted as being 56.678 c.p.s. The reading of the frequency at this point presents no problem, but observe what occurs subsequently. At point 603, the frequency is recorded as 56.698 c.p.s. The frequency then increases to a value which exceeds 56.699 c.p.s. Since 56.699 c.p.s. is the largest value which can be recorded at the right-hand side of the chart, the fine pen crosses to the left-hand side of the chart to record, at the point 604, a value of 56.701 c.p.s. Subsequent to this instant, the frequency decreases to a value slightly less than 56.700 c.p.s. which is the smallest value which can be recorded at the left-hand side of the chart. Therefore, the fine pen crosses to the right-hand side of the chart to record this value. In subsequent instants of time wherein the frequency is fluctuating between values of 56.699 c.p.s., or less, and 56.700 c.p.s., or greater, the pen is crossing repeatedly between the right-hand side of the chart-marking path to the left-hand side of the chart-marking path. This presents a record which is obscure and confused. It is this confusion which is avoided by a recorder having an extended chart-marking path.

While particular embodiment of the invention have been shown and described, it will, of course, be understood that various modifications may be made without departing from the principles of the invention. The appended claims are, therefore, intended to cover any such modifications within the true spirit and scope of the invention.

What is claimed is:

1. In an analog strip chart recorder for recording a digital input with high resolution on a strip chart having two analog type records of different significance with multiple use being made of a portion of the width of said strip chart, said recorder including:

drive means for continuously driving said strip chart in a lengthwise direction, coarse chart-marking means positioned for movement transversely of said strip chart throughout a first chart-marking path divided by a first set of reference marks into visibly distinguishable divisions, fine chart-marking means positioned for movement transversely of said strip chart throughout a second chart-marking path divided by a second set of reference marks into visibly distinguishable divisions, said digital input including at least a digital signal of most significance, a digital signal of intermediate significance, and a digital signal of least significance, the improvement comprising:

a first digital-to-analog converter having an output coupled to said coarse chart-marking means, means for applying said digital signals of most significance and intermediate significance to said first digital-to-analog converter to produce at the output thereof a first recorder signal for driving said coarse chart-marking means through said first chart-marking path to establish a first relation between a change in position of said coarse chart-marking means and a given change in said input signal, a second digital-to-analog converter having an output coupled to said fine chart-marking means, means for applying said digital signals of intermediate significance and least significance to said second digital-to-analog converter to produce a second recorder signal for driving said fine chart-marking means through said second chart-marking path to establish a second relation between a change in position of said fine chart-marking means and a given change in said input signal, and means for proportioning said first and second relations so each of said visibly distinguishable divisions of said first chart-marking path has a significance with respect to the input signal which is one hundred times the significance with respect to the input signal of each of said visibly distinguishable divisions of said second chart-marking path.

2. The recorder recited in claim 1 in which said second chart-marking path is folded about a value other than zero further comprising:

means for incrementing said second recorder signal by a first extra increment, said last-named means being responsive to at least a portion of said digital signal of intermediate significance to increment said second recorder signal only when said digital input is below said value.

3. The recorder recited in claim 2 wherein said digital input is coded in a 1–2–2*–4 binary-decimal code and wherein each digital signal includes four inputs respectively coded to have significance of 1–2–2–4 comprising:

means for applying the input having a significance of 4 to said means for incrementing so that said first extra increment is added to said second recorder signal when said input having a significance of 4 is in the "off" state whereby said second chart-marking path is folded about a value of 6.

4. The recorder recited in claim 1 wherein said second chart-marking path includes a normal region and an adjacent extended section, said recorder further comprising:

means for incrementing said second recorder signal by a second extra increment, said last-named means being responsive to at least a portion of said digital signal of intermediate significance to increment said second recorder signal when said digital input is at a value which could be recorded by said fine chart-marking means in said extended section of said second chart-marking path, and switching means actuated when said fine chart-marking means is below a position within that portion of said normal region of said second chart-marking path which is not duplicated in said extended section, said switching means being so connected that actuation thereof renders said means for incrementing ineffective.

5. The recorder recited in claim 1 wherein said digital input represents a voltage to be recorded, further comprising:

a digital voltmeter producing at the output thereof said digital signals representing the magnitude of said voltage applied to the input of said digital voltmeter.

6. The recorder recited in claim 1 wherein said digital input represents power line frequency, further comprising:

a digital frequency meter producing at the output thereof said digital signals representing the magnitude of said power line frequency applied to the input of said digital frequency meter.

7. The recorder recited in claim 1 wherein said first digital-to-analog converter includes:

a first group of transistors, said digital signal of most significance being applied to said first group of transistors to selectively switch said first group of transistors between their conducting and nonconducting states, a first group of coding resistors, one end of each of said first group of coding resistors being connected to said first group of transistors, a second group of transistors, said digital signal of intermediate significance being applied to said second group of transistors to selectively switch said second group of transistors between their conducting and nonconducting states, a second group of coding resistors, one end of each of said second group of coding resistors being connected to said second group of transistors, the other ends of said first and said second groups of coding resistors being connected together at said output of said first digital-to-analog converter to produce said first recorder signal at said output, and wherein said second digital-to-analog converter includes:

a third group of transistors, said digital signal of least significance being applied to said third group of transistors to selectively switch said third group of transistors between their conducting and nonconducting states, a third group of coding resistors, one end of said third group of coding resistors being connected to said third group of transistors, and a fourth group of coding resistors, one end of each of said fourth group of coding resistors being connected to said second group of transistors, the other ends of said third and said fourth groups of coding resistors being connected to said output of said second digital-to-analog converter to produce said second recorder signal at said output.

8. The recorder recited in claim 1 wherein said digital input includes a triggering pulse occurring at periodic times when said digital signals are stable, said recorder further comprising sample and hold circuitry including:

first and second switching means actuated by said triggering pulse, said first switching means being connected between the output of said first digital-to-analog converter and said coarse chart-marking means to periodically apply said first recorder signal to said coarse chart-marking means only during times when said digital signals are stable, said second switching means being connected between said second digital-to-analog converter and said fine chart-marking means to periodically apply said second recorder signal to said fine chart-marking means only during times when said digital signals are stable.

9. In an analog strip chart recorder for recording from a digital input an analog record with high resolution on a strip chart with multiple use being made of a portion of the width of said strip chart, said recorder including:

drive means for continuously driving said strip chart in a lengthwise direction, chart-marking means positioned for movement transversely of said strip chart throughout a chart-marking path divided by a set of reference marks into visibly distinguishable divisions, a digital-to-analog converter having an output coupled to said chart-marking means, means for applying at least a portion of said digital input to said digital-to-analog converter to produce at the output thereof a recorder signal for driving said chart-marking means through its chart-marking path, the improvement wherein said chart-marking path includes a normal region and an adjacent extended section, said recorder further comprising:

means for incrementing said recorder signal by an extra increment, said last-named means being responsive to at least a portion of said digital input to increment said recorder signal when said digital input is at a value which could be recorded by said chart-marking means in said extended section of said chart-marking path, and switching means actuated when said chart-marking means is below a position, within that portion of said normal region of said chart-marking path which portion is not duplicated in said extended section, said switching means being so connected that actuation thereof renders said means for incrementing ineffective.

10. The recorder recited in claim 9 in which said normal region of said chart-marking path is folded about a value other than zero further comprising:

second means for incrementing said output of said digital-to-analog converter, said second means being responsive to at least a portion of said digital input to increment said output only when said digital input is below said value.

11. In an analog strip chart recorder for making from a digital input signal an analog record with high resolution on a strip chart with multiple use being made of a portion of the width of said strip chart, said digital input signal including at least a digital signal of most significance, a digital signal of intermediate significance, and a digital signal of least significance, said recorder including:

drive means for continuously driving said strip chart in a lengthwise direction, a chart-marking means positioned for movement transversely of said strip chart throughout a chart-marking path divided by a set of reference marks into visibly distinguishable divisions, the improvement wherein said chart-marking path has first and second sections and a third extended section, the reference marks in said third extended section indicating recorded values which are the same as those indicated by the reference marks in said first section, said improvement comprising:

a digital-to-analog converter having an output coupled to said chart-marking means, means for applying digital signals of two adjacent significance to said digital-to-analog converter to produce at the output thereof a recorder signal for driving said chart-marking means through its chart-marking path, means for incrementing said output of said digital-to-analog converter, said last-named means being responsive to at least a portion of said digital input to increment said output when said digital input is at a value which could be recorded by said chart-marking means in said third extended section of said chart-marking path, and switching means actuated when said chart-marking means is at a switching position within said second section of said chart-marking path, said switching means being actuated to a first state when said chart-marking means is on one side of said switching position, said switching means being actuated to a second state when said chart-marking means is on the other side of said switching position, said switching means being connected to render said means for incrementing operative only when said switching means is in said second state.

12. In an analog strip chart recorder for making from a digital input signal an analog record with high resolution on a strip chart with multiple use being made of a portion of the width of said strip chart, said recorder including:

drive means for continuously driving said strip chart in a lengthwise direction, a chart-marking means positioned for movement transversely of said strip chart throughout a chart-marking path divided by a set of reference marks into visibly distinguishable divisions, said digital input signal including at least a digital signal of most significance, a digital signal of intermediate significance, and a digital signal of least significance, the improvement in analog recording comprising:

a digital-to-analog converter having multiple operating modes in which there is selectively applied to the output of said digital-to-analog converter an extra increment, said output being coupled to said chart-marking means, means for applying said digital signals of two adjacent significance to said digital-to-analog converter to produce at the output thereof a recorder signal for driving said chart-marking means through its chart-marking path, said chart-marking path having first and second regions, each region having sufficient visibly distinguishable divisions to record all values of the input variable to be recorded by said chart-marking means, and a common section which is common to both of said regions, said first region consisting of said common section and an adjacent first section, said second region consisting of said common section and an adjacent second section which is remote from said first section and has as many visibly distinguishable divisions as said first section, and a switching means for modifying said digital-to-analog converter operable when the magnitude of said recorder signal moves through a critical value which corresponds to a critical position of said chart-marking means within said common section of said chart-marking path, said switching means having a first state when the magnitude of said recorder signal is in a first range of magnitudes corresponding to a first zone of positions of said chart-marking means, said first zone consisting of said first section and an adjacent portion of said common section bounded by said critical position, said switching means having a second state when the magnitude of said recorder signal is in a second range of magnitudes corresponding to a second zone of positions of said chart-marking means, said second zone consisting of said second section and an adjacent portion of said common section bounded by said critical position, said switching means being connected to said digital-to-analog converter so that said multiple operating modes are such that said chart-marking means, when initially in said common section, in response to a signal to said digital-to-analog converter representative of a value outside of said common section shall move out of said common section in a direction away from said critical position, said switching means being connected to said digital-to-analog converter so that said multiple operating modes are such that said chart-marking means, when initially in said first section, in response to a signal to said digital-to-analog converter representative of a value in said common section shall move from said first section to said common section, moving solely within said first region, said switching means being connected to said digital-to-analog converter so that said multiple operating modes are such that said chart-marking means, when initially in said second section, in response to a signal to said digital-to-analog converter representative of a value in said common section shall move from said second section to said common section, moving solely within said second region, whereby frequent crossings of said chart-marking means unnecessarily produced from minor fluctuations in said digital input signal are hereby avoided and a more lucid analog record is made.

13. The recorder recited in claim 12 wherein said digital-to-analog converter and said switching means include:

means for excluding from said recorder signal said extra increment when said switching means has said first state and the signal to said digital-to-analog converter is representative of a value outside of said common section, and means for including in said recorder signal said extra increment when said switching means has said second state and the signal to said digital-to-analog converter is representative of a value outside of said common section.

14. The recorder recited in claim 12 wherein said digital-to-analog converter and said switching means include:

means for excluding from said recorder signal said extra increment and a second extra increment when said switching means has said first state and the signal to said digital-to-analog converter is representative of a value outside of said common section, means for including in said recorder signal said extra increment and excluding from said recorder signal said second extra increment when said switching means has either of its two possible states and the signal to said digital-to-analog converter is representative of a value within said common section, and means for excluding from said recorder signal said extra increment and including in said recorder signal said second extra increment when said switching means has said second state and the signal to said digital-to-analog converter is representative of a value outside of said common section.

15. The recorder recited in claim 12 wherein said digital-to-analog converter and said switching means include:

means for excluding from said recorder signal said extra increment and a second extra increment when said switching means has said first state and the signal to said digital-to-analog converter is representative of a value outside of said common section, means for including in said recorder signal said extra increment and excluding from said recorder signal said second extra increment when said switching means has either of its two possible states and the signal to said digital-to-analog converter is representative of a value within said common section, and means for including in said recorder signal said extra increment and said second extra increment when said switching means has said second state and the signal to said digital-to-analog converter is representative of a value outside of said common section.

References Cited

UNITED STATES PATENTS

| | | | |
|---|---|---|---|
| 2,673,136 | 3/1954 | Stein et al. | 346—33 |
| 3,214,764 | 10/1965 | Williams | 346—49 |

RICHARD B. WILKINSON, *Primary Examiner.*

J. W. HARTARY, *Assistant Examiner.*

UNITED STATES PATENT OFFICE

CERTIFICATE OF CORRECTION

Patent No. 3,389,397 June 18, 1968

Rowland G. Lex, Jr., et al.

It is certified that error appears in the above identified patent and that said Letters Patent are hereby corrected as shown below:

Column 1, line 61, "signifiance" should read -- significance Column 8, line 10, "Fig. 1" should read -- Fig. 2 --. Column 9, line 13, "0.99" should read -- .099 --. Column 15, line 62, "in" should read -- of --.

Signed and sealed this 10th day of February 1970.

(SEAL)

Attest:

Edward M. Fletcher, Jr.

Attesting Officer

WILLIAM E. SCHUYLER, JR.

Commissioner of Patents